Nov. 7, 1950  P. M. PAPPAS  2,528,776
DEEP FAT FRYING APPARATUS
Filed Jan. 13, 1947  2 Sheets-Sheet 1
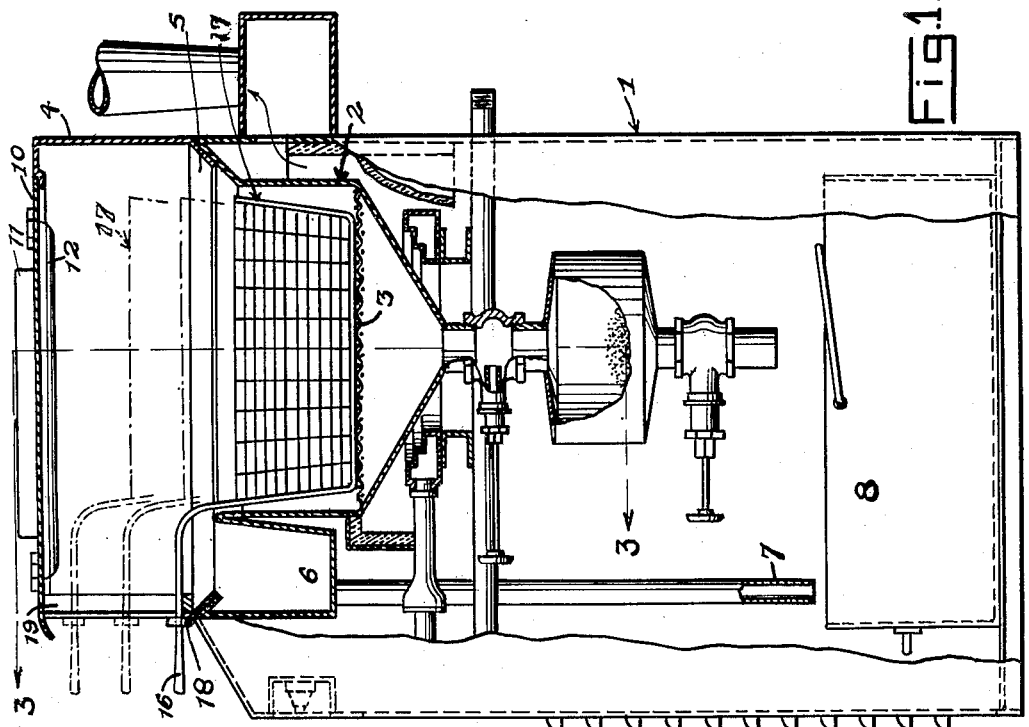
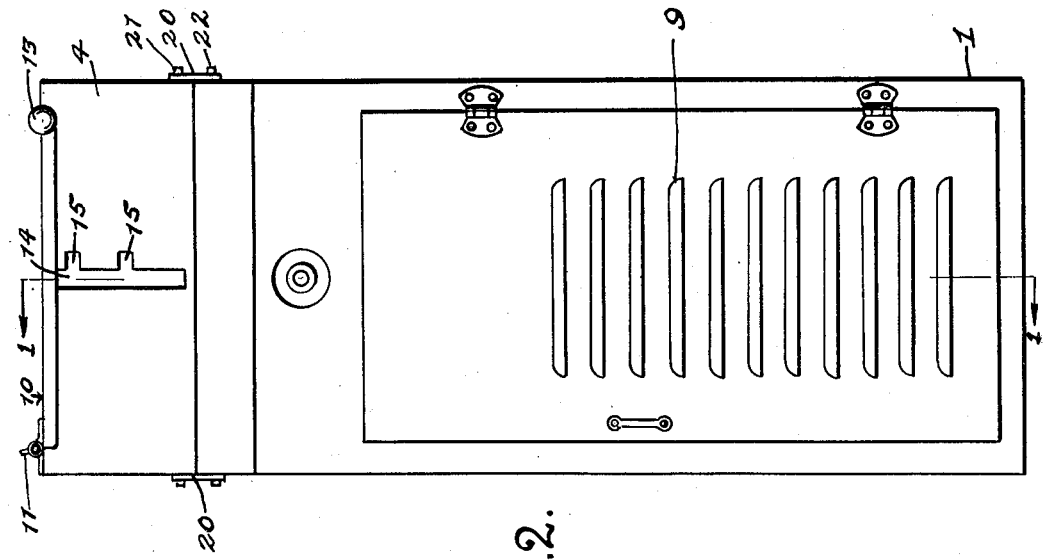
INVENTOR,
Phillip M. Pappas.
BY
E. E. Vrooman & Co.,
ATTORNEYS.

Nov. 7, 1950 P. M. PAPPAS 2,528,776
DEEP FAT FRYING APPARATUS
Filed Jan. 13, 1947 2 Sheets-Sheet 2
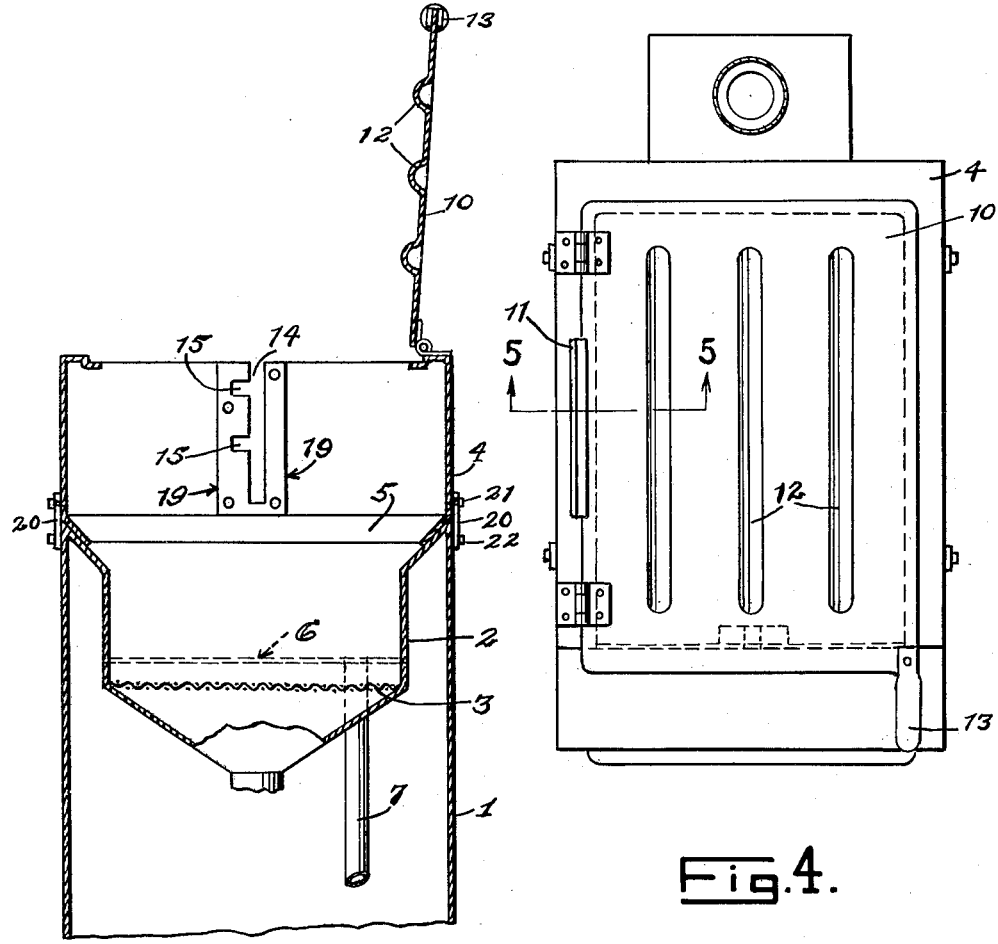
Fig.3.
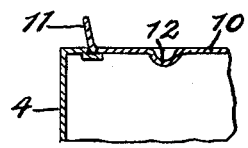
Fig.5.
Fig.4.
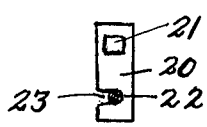
Fig.6.
INVENTOR,
Phillip M. Pappas,
BY
E. E. Vrooman & Co.,
ATTORNEYS.

Patented Nov. 7, 1950

2,528,776

UNITED STATES PATENT OFFICE 2,528,776

DEEP FAT FRYING APPARATUS

Phillip M. Pappas, Houston, Tex.

Application January 13, 1947, Serial No. 721,747

1 Claim. (Cl. 99—411)

This invention relates to a deep fat frying apparatus.

An object of this invention is to prevent loss of grease caused by splatter, as well as vapor coming off the hot fat.

Another object of this invention is to lessen fire hazard and permit a cleaner and more sanitary appearance to the deep fat frying operation in commercial eating establishments.

It is to be understood that in deep fat frying there is a considerable amount of grease lost by splatter when cold foods are deposited in the hot frying fat. The fat will often splatter several feet when cold foods are placed therein. This results in loss of fat, fire hazard, and a deposit of undesirable film of fat on surrounding equipment, hoods, ducts, air filters, etc. In addition to the loss through splatter, there is a certain amount of fat lost in the vapors or smoke coming off the fat, which vapors condense and become deposited on the hood above the equipment, or in the air filter placed on the duct leading from the hood.

There is also present in the deep fat frying operation the danger loss in resultant mess caused by fat foaming or boiling up over the sides of the frying container. This can be observed when raw French cut potatoes are placed in the hot frying fat; the fat will boil up considerably with a result that it will sometimes overflow the fryer and run down the sides of the cabinet.

Therefore, still another object of this invention is to prevent the loss of fat by splatter, as well as that carried off by the vapors and the smoke of the fat, which is accomplished by a novel and efficient hood that fits over the top of the frying container in such a manner that it can be easily detached and cleaned. This hood is provided with a hinged cover or lid so that the chef may easily open or close same for putting in and taking out the baskets containing food, and may conveniently observe the food cooking.

This invention relates to certain valuable improvements over the disclosure in my prior United States Patent No. 2,338,964, issued January 11, 1944, upon a frying apparatus.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a vertical sectional view of an apparatus constructed in accordance with the present invention, taken on line 1—1, Fig. 2, and looking in the direction of the arrows, while Figure 2 is a view in front elevation.

Figure 3 is a fragmentary sectional view taken partly on line 3—3, Figure 1, and looking in the direction of the arrows.

Figure 4 is a top plan view.

Figure 5 is a sectional view taken on line 5—5, Fig. 4, and looking in the direction of the arrows.

Figure 6 is a view in elevation of one of the four slip-type metal straps.

Referring to the drawings in which the preferred embodiment of my invention is illustrated, 1 designates the cabinet in which is the frying container 2 having screen 3.

A cover or hood 4 is on the upper end of the cabinet 1, this hood 4 being provided with an inwardly extending flange 5; said flange 5 fits snugly upon the upper end of the frying container 2 as clearly shown in Figure 1. An overflow well 6 is formed in the cabinet and extends across the entire front of the frying container 2. The top of the overflow well 6 is below the top of frying container 2 whereby any fat or grease boiling over the upper part of the frying container will flow into the overflow well 6 before running over the top edge of the frying container 2. A condenser pipe 7 is in communication at its upper end with the overflow well 6, and its lower end empties into the drain pan 8. Air passing in through the louvers 9 will chill or cool condenser pipe 7 sufficiently to congeal the fat or grease as is best when passing into the drain pan 8.

The hood 4 is provided on its top with a hinged cover or lid 10, which lid is provided with an elongated flange 11 that acts as a stop in preventing the raised lid (Fig. 3) from swinging too far open. The hinged lid 10 is also provided with elongated rounded depressions 12. A suitable handle 13 (Fig. 4) is on one end of the lid 10 for enabling the operator to easily manipulate the lid.

On the front of the hood 4 is a vertical opening 14 that has preferably two horizontal slots 15. When the handle 16 of the basket 17 is at the bottom of the vertical opening 14, the basket will be as shown in Figure 1, resting upon the screen 3. When desired, the operator can lift on the handle 16 placing it in the lower slot 15, or in the upper slot 15 as desired, which adjusted positions are shown in dotted lines, Fig. 1. The handle 16 is provided with a fixed flange 18 against the face of the hood 4. This flange 18 serves to position or center the basket 17 with respect to the frying container 2. The hood 4 is thickened at the portion in which the vertical opening 14 is formed as shown at 19 (Fig. 1). Therefore, the slots 15 and vertical opening 14, together with the flange 18, are in the nature of a stabilizing device, for holding the basket 17 in a horizontal position when raised within the hood, as shown by dotted lines in Figure 1. It will also be apparent that upon raising the hinged lid 10 and lifting upward on the handle 16, the basket 17 may be entirely removed from the cabinet and hood as the operator desires.

To lock the hood on the cabinet 1 against accidental displacement there is provided preferably flat metal straps 20, each strap 20 being rotatably secured, at 21, to the hood 4 while pin 22 is on the side of the cabinet 1, which pin 22 enters slot 23, whereupon the hood is temporarily locked upon the cabinet 1, against accidental displacement.

It is further to be understood that when the basket is in a raised position, as indicated by the dotted lines in Figure 1, said basket is in a draining position after the food is cooked. Deep frying is done when the basket handle is in the lowest position with the basket 17 resting on screen 3.

The easily removable hood 4 is designed in a manner so that the grease droplets will be returned to the frying container; further, the hood is easily removable without the use of any tools, so that it can be taken off and cleaned easily. The hood 4 is provided at the front with an adjustable basket handle support 14, 15, so that the food being fried may be lifted out of the fat and remain in a draining position without opening the cover of the hood 4. This is also important as it permits the operator to keep the food in the basket 17 warm until it is served.

Also, the middle position of the front basket rest permits surface frying, whereas, the lower position of the basket rest permits deep frying. It is therefore quite evident that the basket handle support incorporated into the front portion of the hood is a very important part of this invention.

In order to condense the vapors in the cooking operation, the condenser pipe 7 is provided which also serves to return the overflow from the foaming grease to the drip pan.

The elongated rounded depressions 12 serve to allow the splattered fat to accumulate sufficiently that it will drop back into the frying container 2.

For further information about the general features of this frying apparatus, reference may be had to my aforesaid United States Patent No. 2,338,964.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claim.

What I claim is:

In an apparatus of the class described, the combination with a cabinet, of a hood fitted on said cabinet, said hood provided with a reinforced portion on its front, said reinforced portion provided with a vertical opening opened at its top, said hood provided with a horizontal slot near the middle of said opening and with a horizontal slot near the top of said opening, said slots opening at their outer ends upon said vertical opening, a movable lid on said hood and normally closing the upper end of said vertical opening, a basket in said cabinet, said basket provided with a handle extending through said vertical opening, said handle being adapted to rest in said horizontal slots, said handle provided outside of said hood with a fixed flange, said flange normally bearing against the outer face of said hood, and said fixed flange when engaging the outer face of said hood contiguous to either one of said horizontal slots adapted to hold the basket in a steady horizontal position within the hood, substantially as shown and described.

PHILLIP M. PAPPAS.

REFERENCES CITED

The following references are of record in the file of this patent:

UNITED STATES PATENTS

| Number | Name | Date |
| --- | --- | --- |
| 210,879 | Roberts | Dec. 17, 1878 |
| 515,163 | Pauly et al | Feb. 20, 1894 |
| 564,492 | Westerbeck | July 21, 1896 |
| 1,315,908 | Childress | Sept. 9, 1919 |
| 1,515,003 | Watson | Nov. 11, 1924 |
| 1,518,142 | Gerard-Festenburg | Dec. 9, 1924 |
| 1,668,923 | Rymann | May 8, 1928 |
| 1,680,539 | Hadi | Aug. 14, 1928 |
| 2,219,949 | Childs | Oct. 29, 1940 |
| 2,243,661 | Tota | May 27, 1941 |
| 2,287,396 | Roth | June 23, 1942 |
| 2,397,410 | Deacon | Mar. 26, 1946 |